United States Patent
DiGiorgio

(10) Patent No.: US 6,862,684 B1
(45) Date of Patent: Mar. 1, 2005

(54) METHOD AND APPARATUS FOR SECURELY PROVIDING BILLABLE MULTICAST DATA

(75) Inventor: Rinaldo DiGiorgio, Easton, CT (US)

(73) Assignee: Sun Microsystems, Inc., Santa Clara, CA (US)

(*) Notice: Subject to any disclaimer, the term of this patent is extended or adjusted under 35 U.S.C. 154(b) by 916 days.

(21) Appl. No.: 09/627,842

(22) Filed: Jul. 28, 2000

(51) Int. Cl.[7] .............................................. G06F 11/30
(52) U.S. Cl. ........................ 713/163; 713/168; 713/176; 713/182; 713/189; 713/193; 713/200; 713/201
(58) Field of Search ................................ 713/163, 168, 713/176, 182, 189, 193, 200, 201

(56) References Cited

U.S. PATENT DOCUMENTS

| | | | |
|---|---|---|---|
| 5,561,670 A | * 10/1996 | Hoffert et al. | 370/410 |
| 5,771,352 A | * 6/1998 | Nakamura et al. | 709/227 |
| 5,841,976 A | * 11/1998 | Tai et al. | 709/204 |

OTHER PUBLICATIONS

Jason Scherer, "Restricted–channel Multicast in Java," Java-World, Sep. 1998, {http://www.javaworld.com/javaworld/jw–09–1998/jw–09–javadev_p.html} (visited May 9, 2000).

Carol Levin, "Trends: On he Horizon," PC Magazine Online, May 8, 1998, {http://www.zdnet.com/pcmag/news/trends/t980508a.htm} (visited May 9, 2000).

* cited by examiner

*Primary Examiner*—Thomas R. Peeso
(74) *Attorney, Agent, or Firm*—Gunnison, McKay & Hodgson, L.L.P.; Philip J. McKay

(57) ABSTRACT

The present invention comprises a method and apparatus for securely providing billable multicast data. The invention describes a solution that provides an architecture for enabling different types of security devices to operate interchangeably in very large consumer networks, corporate networks, for authentication and metered access to services, as well as payment. An embodiment of the invention comprises a mechanism for ensuring that only authorized parties may obtain access to a particular data stream. For example, the present invention provides a way build a restricted-channel system. In a restricted-channel system, a multicast server transmits encrypted information that can be deciphered by authorized multicast client programs or multicast client programs operating under authorized conditions. Access to the multicast data is allowed when the data is appropriately decrypted or otherwise verified and/or the payment is obtained from a portable device such as a smart card.

1 Claim, 5 Drawing Sheets

METHOD AND APPARATUS FOR SECURELY PROVIDING BILLABLE MULTICAST DATA

FIELD OF THE INVENTION

This invention relates to the field of computer software. More specifically, the invention relates to a method and apparatus for securely providing billable multicast data.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever. Sun, Sun Microsystems, the Sun logo, Solaris, SPARC, "Write Once, Run Anywhere", Java, JavaOS, JavaStation and all Java-based trademarks and logos are trademarks of Sun Microsystems, Inc. in the United States and in other countries.

BACKGROUND

A computer network is sometimes used to deliver streams of data to one or more computers on a network. Multicasting is a known technique for transmitting such data. Multicast technology supports an architecture that allows one stream of data to be read by multiple users. This type of technology saves bandwidth and provides a way to disseminate data to a wide array of users. For example, Internet radio stations, TV stations, and other such information channels may use multicasting to transmit any type of data that many users wish to view. Often the party transmitting the multicast wants to restrict access to the multicast or charge a dollar amount for the multicast data. However, currently deployed multicasting techniques do not have an authentication and payment infrastructure. Modern Secure Authentication schemes often require something you have (e.g., a smart card) and something you know (e.g., a password). One of the problems with deploying smart cards is that they require smart card readers, which add costs and if the reader does not have an integral keypad for pin entry they are still vulnerable to data keyboard sniffing.

Multicasting:

Multicasting is a technique for transmitting data from one computer to many different computers or from many computers to many other computers. Transmitting a corporate message to a group of employees or sending an audio feed to numerous computer users are examples of multicasting. Multicasting is widely used to propagate data to multiple network nodes (e.g. computers).

In a multicast environment, a properly configured computational device can perform one operation to transmit data to multiple destination devices. For example, using multicasting a person can transmit video data to many different computers by initiating a single multicasting session. Under the multicast model only network nodes that are actively interested in receiving a particular multicast have such data routed to them. On some networks, certain network nodes automatically ignore multicast data. For example, some network routers are configured to prevent multicast data from entering a subnet. Computational devices designed to implement firewalls or other such filtering mechanisms may also be configured to ignore multicast data.

Multicasting is typically utilized to disseminate data to a plurality of network nodes in a single transmission. To support multicasting the network infrastructure as well as the sending and receiving node(s) are multicast enabled. This includes any intermediate routers that may be involved in transmitting data between networks. The computational device responsible for performing the multicasting is not required to maintain a list of recipients. Instead, the device transmits a single copy of the multicast message to all the members of a host group. Copies of the message are made when a router determines divergent paths are necessary to deliver the message to host group members.

A problem with multicasting is that multicast enabled networks are not designed to provide an easy system for authenticating and obtaining payment from users who wish to access the multicast data. For example, the prior art does not provide users with a way to utilize a smart card to pay for access to a particular multicast.

Multicasting Components:

Referring now to FIG. 1 an illustration of a network topology configured to support multicasting is shown. Sending node 100 and receiving nodes 101 are connected to network 125. Network 125 is a Local Area Network (LAN). The remaining nodes 102–104 attached to network 125 are not configured to accept multicast data. Sending node 100 and receiving node 101, however, are configured to accept multicast data. This is accomplished by 1) installing the appropriate network hardware and 2) configuring the two nodes to accept and transmit the necessary protocols (e.g. TCP, IGMP). Additionally, a software application capable of sending and/or receiving multicast data is necessary. When sending nodes 100 and receiving nodes 101 are properly configured data can be multicast from sending node 100 to receiving node 101 along path 122. Data that is multicast may also be sent to multiple nodes. For example, it is possible to configure remaining nodes 102–104 to accept and/or perform multicasting.

Transmitting data to other networks, however, requires additional configuration and/or equipment. For example, for network 150 to begin receiving multicast data a multicast router 130 is required. Multicast router 130 distributes and replicates the multicast data stream as is necessary to provide requesting network nodes with data. To have the ability to transmit multicast data between networks requires that all routers present on the path from network 125 to network 150 be multicast capable. For example, if data is transmitted from network 125 to network 150 using path 144 then networks 175–177 are multicast capable. However, if networks 175–177 do not contain routers that support multicasting, tunneling may be used to send multicast data through network 140 using networks 178–180. Tunneling is used to connect islands of multicast routers separated by links that do not support multicasting (e.g. networks 178–180). When this approach is used multicast datagrams are encapsulated into standard unicast datagrams and sent through network 140. Tunneling may be used to send multicast data across the Internet (e.g. MBONE) or any other type of viable communication network.

Network 125 and network 150 both contain a firewall 199. Firewalls 199 prevent unauthorized data from entering a network. When a firewall 199 is present on a network, such as network 125, network 150, or network 140, the firewall may need to be reconfigured to permit multicast traffic. Network 125 and network 150 may also contain multicast filtering switches. A multicast filtering switch provides a way to localize the amount of data traffic disseminated on a LAN. If, for example, a filtering switch is installed on network 125, data will only be sent to participating nodes rather than to all segments on the LAN. A filtering switch allows receiving node 101 to receive multicast data from sending node 100 without interfering with remaining nodes 102–104.

If all participating networks are properly configured to accept multicast data sending node 100 may send an identical copy of data 133 to all the nodes that request it. For example, data may be sent using path 144 from sending node 100 to receiving nodes 101, 152, 153, and 154.

Sending and Receiving Multicast Data

IP multicasting is a form of multicasting data across the Internet. IP multicasts adhere to an addressing standard defined by the Internet Assigned Numbers Authority (IANA). To send data, the sender specifies a destination address which is representative of a host group and uses the "Send IP" operation to transmit the data. The "Send IP" operation is the same operation used to transmit unicast data. To receive multicast data a user's host application requests membership in the multicast host group associated with a particular multicast. For example, if the user wants to view a multicast of events taking place on the Space Shuttle, the user may request to view that event by issuing a membership request. The user's membership request is then communicated to the network hardware which disseminates the request. In some instances the request is communicated to the LAN router. If data is to be sent off the LAN the request is communicated to intermediate routers between the location of the sender and the receiver. The user's membership request also causes the receiving computer to start filtering for addresses associated with the multicast address identified in the initial request. The receiving computer's network interface card, for example, starts filtering for the specific data link layer addresses associated with the multicast. If the multicast is initiated outside the LAN the WAN router delivers the requested multicast data to the LAN router. The LAN router builds the message and forwards it to the receiving computer. The receiving computer listens for expected multicast data and passes received data to the TCP/IP protocol stack, which makes the data available as input to the user's application (e.g. a video viewing application).

A problem with IP multicasting is that multicast enabled networks are not designed to provide an easy system for authenticating and obtaining payment from users who wish to access the multicast data. For example, the prior art does not provide users with a way to utilize a smart card to pay for access to a particular multicast.

SUMMARY OF THE INVENTION

The present invention comprises a method and apparatus for securely providing billable multicast data. The invention describes a solution that provides an architecture for enabling different types of security devices to operate interchangeably in very large consumer networks, corporate networks, for authentication and metered access to services, as well as payment. An embodiment of the invention comprises a mechanism for ensuring that only authorized parties may obtain access to a particular data stream. For example, the present invention provides a way build a restricted-channel system. In a restricted-channel system, a multicast server transmits encrypted information that can be deciphered by authorized multicast client programs or multicast client programs operating under authorized conditions. In one embodiment of the invention, a decode device such as a smart card (e.g. a Java Card) provides the data necessary to perform a decode operation. For example, a public and/or private key may be stored on the smart card and utilized to decrypt or encrypt multicast data received from a multicast server. Payment information, such as a line of credit or a debit may also be stored on the smart card or some other type of device. Thus, the smart card may function as a "purse" that is capable of performing debit and credit functions in addition to having the ability to hold digital money.

An embodiment of the invention provides portable devices, such as a PDA or Cell Phone, or any other such device, with the ability to authenticate a user and provide payment on behalf of the user. In this instance, the security mechanism may be hidden from the user and reside on the circuitry and/or software associated with the device.

DETAILED DESCRIPTION

A method and apparatus for securely providing billable multicast data is described. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.

Figure 3:
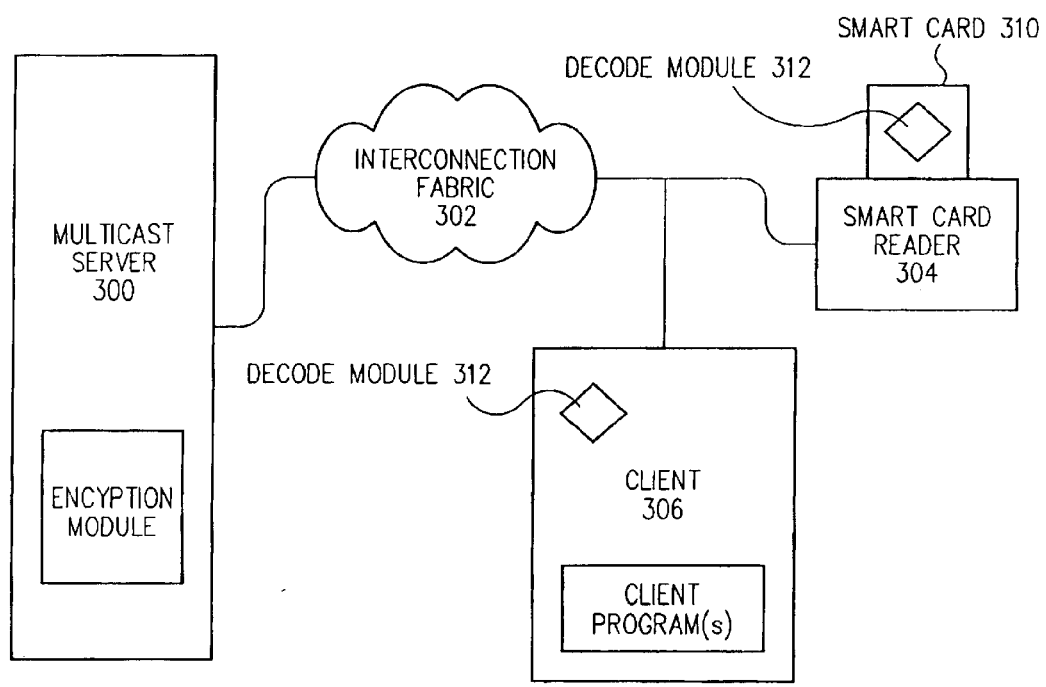
FIG. 3 is an illustration of a network configured to allow the transmission of multicast data.

System Overview:

An embodiment of the invention comprises a mechanism for ensuring that only authorized or paying parties may obtain access to a particular data stream. For example, the present invention provides a way build a restricted-channel system. In a restricted-channel system, a multicast server 300 (See e.g., FIG. 3) transmits encrypted information that can be deciphered by authorized multicast client programs 302 or multicast client programs operating under authorized conditions on a client computer 306. In one embodiment of the invention, a decode device such as a smart card 310 (e.g. a Java Card) provides the data necessary to perform a decode operation. In other instances a computational device such as a PDA, a cell phone, or any other type of computing platform may function as the decode platform. The decode operation may be performed by software executing on the decode device itself (e.g., decode module 312). However, in some instances the software performing the decode operation resides on a client computer associated with the decode device. In accordance with one embodiment of the invention, decryption and payment are handled by decode module 312 residing on the decode device. For example, the decode module may be embedded into a smart card that functions as a "purse" and is capable of performing debit and credit functions in addition to having the ability to hold digital money.

An embodiment of the invention utilizes multicast server 300 to distribute data. Multicast server 300 is configured to transmit data to many listeners (e.g., client computers 306) at the same time. On the Internet, or any interconnection fabric with a bus architecture, each machine on the network receives all packets sent to a machine—even machines the packets are not addressed to. This situation is typically invisible to users because a network node ignores any packets not specifically addressed to it. However, there is a special "multicast address" reserved on the Internet for communication intended for many recipients. Multicast server 300 may utilize this "multicast address" to transmit data.

In the restricted-channel system utilized by an embodiment of the invention, multicast server 300 transmits encrypted information, which can be deciphered by either: (a) authorized multicast client programs 308, or (b) multicast client programs 308 operating under authorized conditions, such as those submitting payment for the service. Multicast client programs 308 are configured to obtain the information needed to decode the encrypted message from decode device 310 (e.g., the smart card).

Figure 1:
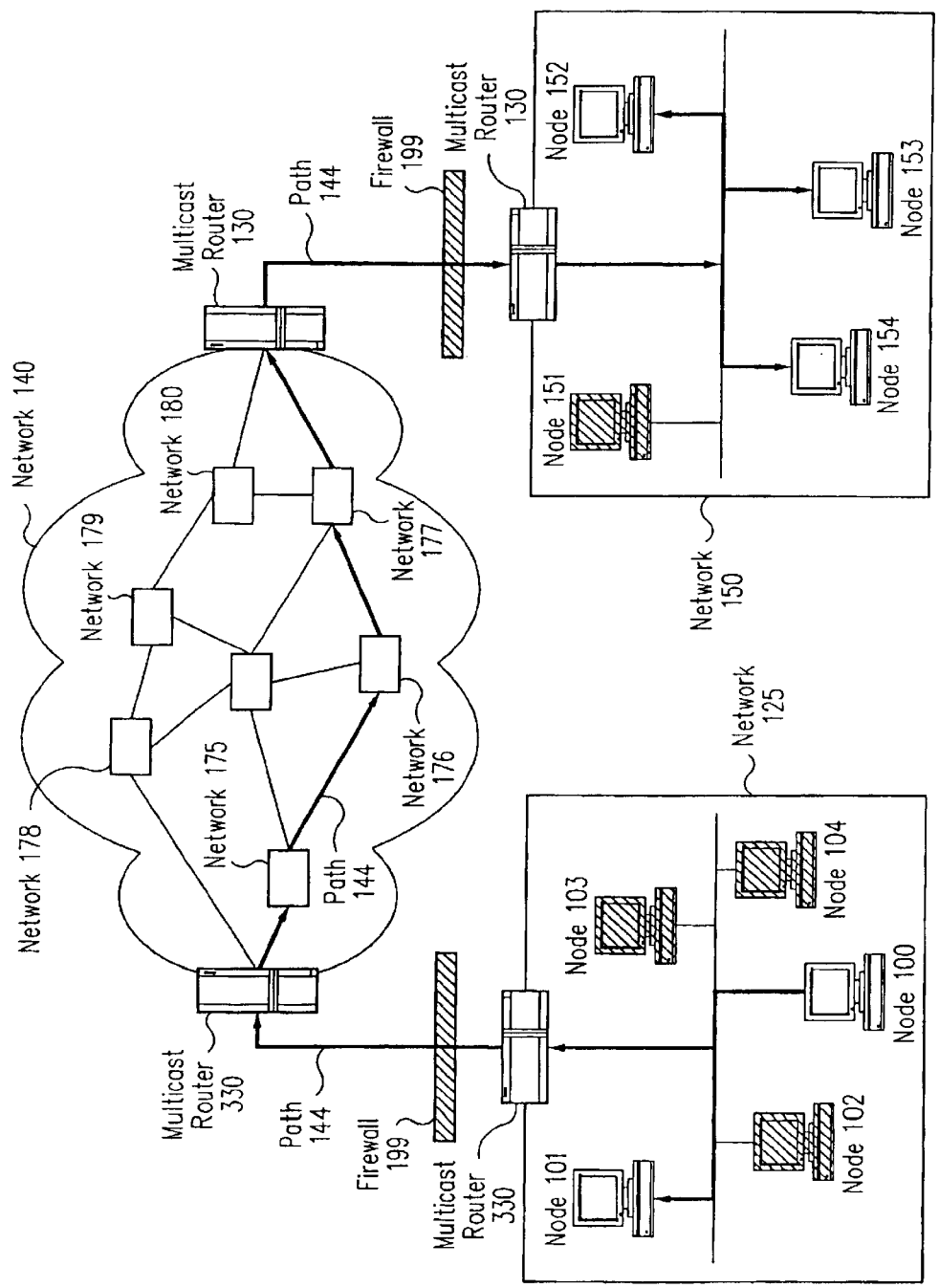
FIG. 1 illustrates a network topology configured to transmit multicast data.
Figure 2:
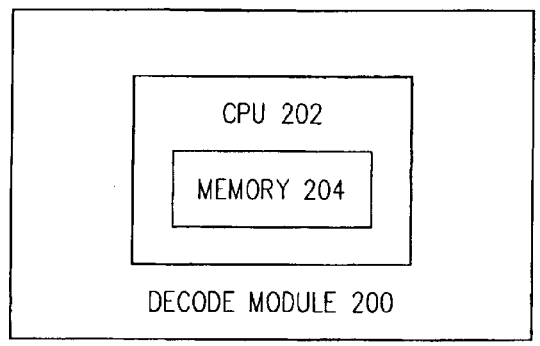
FIG. 2 illustrate a decode module utilized in accordance with one embodiment of the invention.

FIG. 2 illustrates the components of a decode module utilized by an embodiment of the invention. In one instance decode module is configured to execute on any computational platform comprising memory 204 and CPU 202. Decode module, for example, be a configured to execute on a portable computing platform such as a smart card, PDA, cell phone, or any other such device. Decode module may be implemented in hardware and/or software. In accordance with one embodiment of the invention memory 204 comprises a public key which complements the private key utilized by the multicast server to encrypt data transmitted to the device.

In one embodiment of the invention the multicast server uses the Java Reliable Multicast Service (JRMS). Reliable multicast may be distinguished from standard multicast in that any and all packets transmitted over the network must be received correctly, or the client will ask the server to continually retransmit until a correct packet is received. (TCP, the reliable unicast protocol used by the Internet, and UDP, its unreliable cousin, may be more familiar to some readers).

An embodiment of the invention may be implemented as a client program configured to accept and decrypt data transmitted to the client from a multicast server. For example, the invention may comprise a desktop stock-ticker window, implemented using Abstract Windowing Toolkit (AWT) classes and a JRMS multicast client socket. The multicast server may obtain the channel content (e.g., stock quotes) through a JRMS server socket. The content may be obtained from a disk, a web server, or any other type of computing platform configured to parse and deliver multicast data to the client program.

Restricted-Channel Multicast

Utilizing restricted multicast allows for information services with an organization to be disseminated to a group of authorized users. For example, the invention allows for information be distributed to a select group of top-executives without having the information travel across unauthorized network nodes. For multicast services that require payment, an embodiment of the invention contemplates the use of a restricted-channel system. Such a system provides a way to prevent theft of service. Some sort of cryptographic system is the best way to implement a restricted channel. For example, an embodiment of the invention contemplates the use of asymmetric key encryption systems (e.g., PGP). The invention may use various encryption algorithms to encode the restricted channel. For example, algorithms such as CAST, IDEA, TripleDES, and/or any other encryption algorithm capable of adequately encrypting message data. In the instances where payment is not an issue, any relatively strong encryption scheme may suffice. Even if payment is not an issue, a strong enough encryption scheme could allow even military or governmental multicast applications, where security is required for other reasons. For example, work orders could be multicast in real-time to different stations with a restricted-channel system. Software updates could be sent automatically over the Net to a large customer base or in other instances upper-level management of large corporations could send updates on specials to restaurant franchise local managers, or warehouse managers.

In one embodiment of the invention a decryption module is configured to decode message data sent via a restricted multicast channel. The decryption module holds the key for decrypting the message data via the appropriate algorithm. The decryption process may be performed by a decode module executing on a portable device, such as a smart card, cell phone, PDA, or any other device that may be readily moved from one location to another. For example, in one embodiment of the invention, the portable device stores a key (e.g., a public key). Executing the decode module and storing the key on the portable device prevents the key from being compromised during transmission to a decryption process running on the host system. The portable device becomes an information cul-de-sac from which there is only one point of information ingress and egress. One embodiment of the invention utilizes smart cards to store the decode module and key information. Smart cards comprise an onboard computational device—with erasable and rewritable memory, a processor, and an operating system. Thus, smart cards provide an embodiment of the invention to with a mechanism for programs that use ultra-sensitive data to begin, execute, and finish without ever allowing any of the sensitive information to leave the cul-de-sac (e.g., the potable device).

An embodiment of the invention is implemented using a client program configured to accept a type of multicast data. The client program, for example, may be configured to accept stock data, multimedia data, image data, video data, application program data, or any other kind of data that can be transmitted to the client program via a restricted multicast system. The client program executes on the portable device and may contain the decode module. The client program may support any encryption scheme that can provide for a relatively secure data communication channel. In one embodiment of the invention the portable device contains an onboard key and decryption system that is integrated into a reliable multicast system.

In one or more instances an embodiment of the invention may be implemented using the Java programming language. However, the other programming languages may also be utilized to implement the invention. The client program that executes on the portable device may comprise multiple executable files. For instance, the client program may comprise a package that contains multiple Java files (e.g., an optional debugging interface and source for one or more executable classes).

Figure 4:
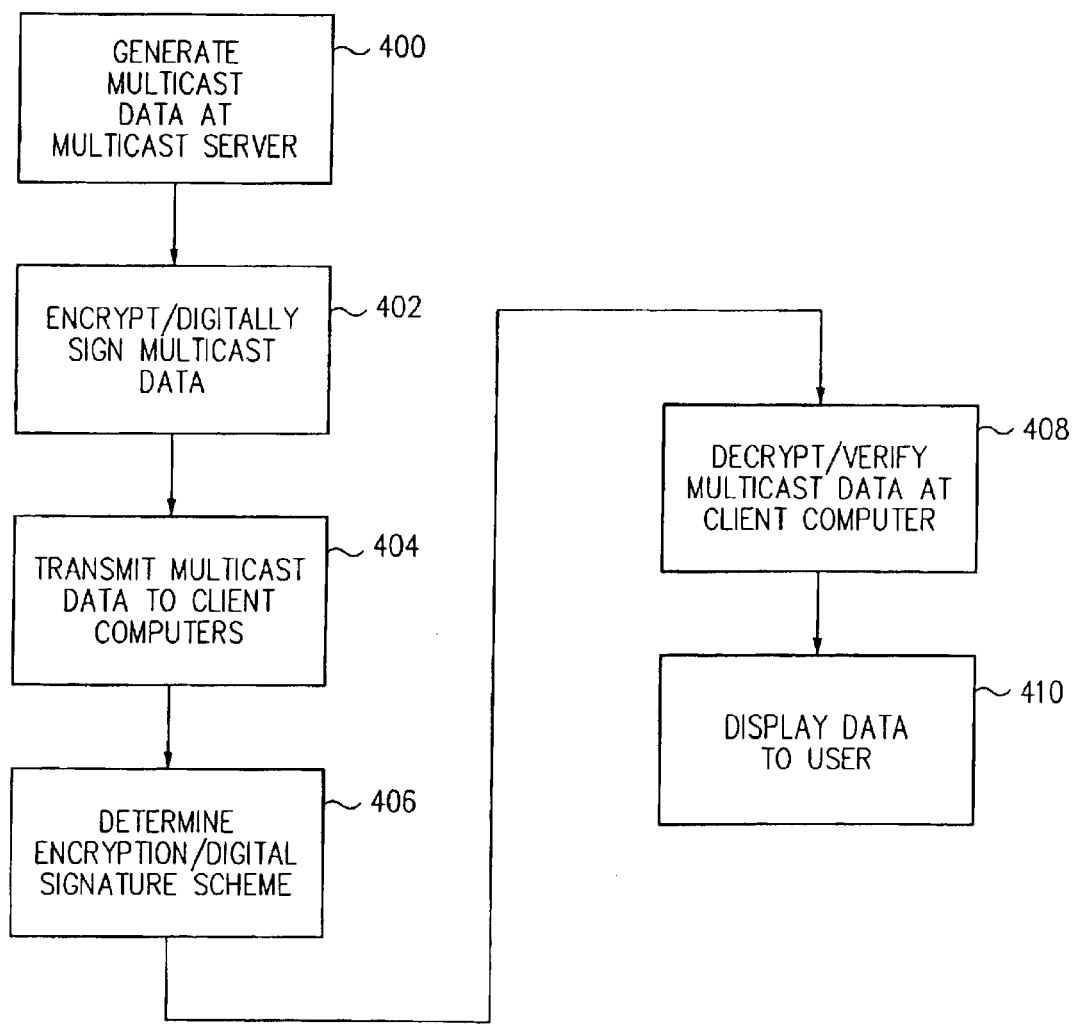
FIG. 4 provides an illustration of the process utilized by an embodiment of the invention to transmit multicast data to authorized or paying parties.

Data Transmission Process:

Referring now to FIG. 4, an example of the process utilized by an embodiment of the invention to transmit multicast data to authorized or paying parties is shown. The process begins when the source of the multicast data (e.g., the multicast server) generates the data that is to be sent via multicast (e.g., step 400). The multicast server then encrypts the stream of data (e.g., step 402) using one of a number of security techniques. Recipients will be provided with a mechanism to decode this stream of encrypted data. The invention contemplates the use of asymmetric (e.g., Public/Private key schemes) and symmetric encryption schemes. In addition to encrypting the data invention contemplates a scheme where the multicast data is digitally signed. This allows users to verify that the data is authentic. Such a scheme is useful when the receiving and/or sending user does not mind if other parties view or obtain access to the data. However, it would allow the user to verify that the data came from the source it purports to be from. The multicast server may elect to encrypt or sign some or all of the packets sent to the client computers. The data that is sent may be encrypted and digitally signed, or the data may be encrypted or digitally signed.

Once the data is appropriately encrypted or digitally signed, the multicast server transmits the data to a plurality of client computers (e.g., step 404). The client computer is then tasked with determining what digital signature scheme or encryption scheme was utilized (e.g., step 406). The invention may utilize various algorithms that enable the sender/receiver to identify what type of encryption or signature scheme the multicast server used to encode the data. For example, the sender and receiver may enter an initial negotiation phase to detect the type of security being used. The negotiations would allow the system to identify what encryption of verification mechanism to use in order to decode the multicast data. The negotiation may, for example have some typically outcomes such as:

Sha1 Digests on data packets
MD5 Digests on data packets
Use Private key A with RC4 to decode packets
Use DES, IDEA, Elliptic Curve encryption schemes, and/or zero knowledge proofs to decode packets.

Once the appropriate verification/decryption scheme is identified, each client computer verifies and/or decodes the data (e.g., step 408). For example, one approach contemplated by an embodiment of the invention deals with the fact that not all data can be decrypted in real time because of the computation limitations imposed on smart cards. This approach uses a heuristic algorithm that determines whether to encrypt or decrypt based on the randomness of data in the packet. For example, each packet in the multicast data stream may be analyzed (or a certain interval of packets may be analyzed) to determine whether the data is normalized. The technique produces a random distribution of values in each encrypted packet. The receiver of this encoded multicast packet can perform empirical test to determine whether to decode the packet. Such tests may be based on how random the data contained in the packet is. To overcome the performance limitations inherent in the decode module (e.g., the smart card or other computing platform), every nth packet may be looked at. Using the technique of looking at every nth packet is beneficial because it allows existing data formats such as MP3 (or any other protocol) to be transmitted over multicast without having to rework the protocol. The invention may also elect to encrypt every nth packet and to then decrypt the corresponding nth packet at the client computer using a secure portable token device (e.g., the decode module). In an embodiment of the invention, the multicast data is signed using a digital signature. For example, the invention supports the following arrangement of signature information:

[data [optional signature]] [data] [signature] [data]

Secure token devices such as smart cards, java compatible smart cards, and iButtons provide the portable security needed for multicast. Unlike unicast, multicast encryption/decryption has the property of many users receiving the same data so that if the data is encrypted and each user is given a key to decrypt the data a secure channel may be put in place. For example, if the data is encrypted and sent via multicast, there is no point to point communication, thus the data may be encrypted once (via a public key) and decrypted by multiple parties who have the appropriate key (e.g., a private key). The keys provided to the recipients may be embedded into the memory of a decode module (e.g., a smart card) and made to be the same for each user. Holding the key in such a location has the benefit of provided an added layer of security to the multicast transmission. For example, the key may be provided only to certain users after accepting payment from them or after they have subscribed to a particular service. Moreover, the secure portable environment provides the users with a way to easily move the key from one location to another. If the key is placed on a smart card, for example, the multicast data may be obtained by the holder of the smart card from any location having a smart card reader. If the key is on a PDA, the user may receive the multicast data from any device where the PDA can send/or receive data. This location may be a wireless connection or a docking station. Once the multicast data is decrypted or verified/authenticated using the information contained in the secure portable environment, the data may be provided to the user. At step 410, for example, the data is displayed to the user.

Figure 5:
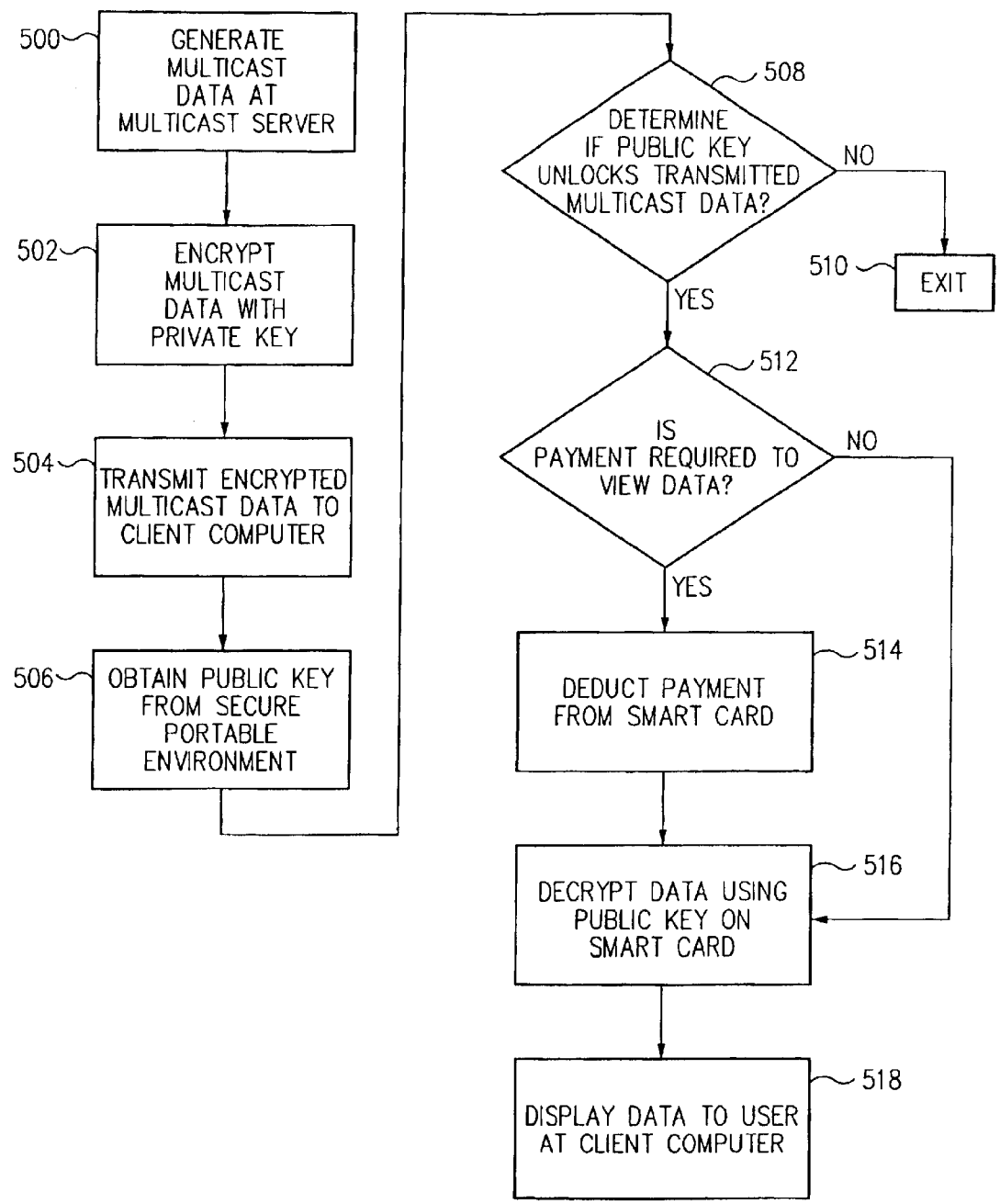
FIG. 5 provides an illustration of the process utilized by an embodiment of the invention to support subscription or payment based multicasts.

Paid/Subscription Based Services:

FIG. 5 provides an illustration of the process utilized by an embodiment of the invention to support subscription or payment based multicasts. At step 500, the multicast server generates the multicast data, the process may then encrypt the data at step 502 using a private key. If the data is to be digitally signed, the multicast server may also sign the data that is to be transmitted. Once the data is appropriately packaged, it is transmitted to one or more client computers executing client programs configured to receive multicast data (e.g., step 504). Once the client-computing device receives the data it obtains the corresponding public key from the secure portable environment (e.g., a smart card) at step 506. The client computer platform (or the secure portable environment) may then execute step 508 where it determines if the public key will unlock the multicast data. If the public key does not unlock the multicast data that is encrypted, step 510 executes and the process exits thereby preventing the client program from receiving the multicast data. If the client platform determines that it can unlock or properly authenticate the multicast data, step 512 executes. At step 512 the client platform determines if payment is required to view and/or receive the data. If payment is required, the amount required may be deducted from the smart cards. The invention contemplates various payment schemes and may, for example, allow the user to subscribe to a multicast service or pay when the user elects to receive a particular multicast.

A. Subscription Based:

If the subscription model is implemented, the server encrypts the multicast data. Recipients can decrypt the data stream if the have a decryption application applet which resides on the decode module (smart card/JavaCard) associated with the receiving user. The decryption applet obtain the data needed from the decode module to determine if the user has a current subscription. In this instance, the multicast data may have a time stamp and the decode module or the decryption applet has a time for which the module or applet can operate. For example, if the user has a smart card, the user may be able to receive a certain multicast data stream for a certain time interval. Once that time interval passes, the user is no longer permitted to access the multicast data stream unless the user renews the subscription.

B. Pay As You Go:

If the pay as you go model is used, then certain amount of money is debited from the recipient's decode module/ smart card for each bit/byte of data received. The user may also be charge for view or accessing the multicast data according to a time interval. For example, the user may be required to pay X $ per hour.

In both of the payment models described here the multicast data stream may comprises the data that is being transmitted and/or a time/control stamp. The data may optionally be encrypted. The invention also contemplates the use of other payment models and may, for example, support the use of customized payment schemes that are tailored to meet the needs of a particular business.

Once the payment is deducted from the decode module (e.g., smart card), the process proceeds to step 516 where the multicast data is decrypted using the public key obtained from the decode module/smart card. If payment is not required to view the data, the process bypasses step 514 and executes step 516 where it decrypts the data. Once the data is decrypted, the multicast data may be displayed or accessed by the user's client computing-device.

Interconnection Fabric:

In the invention, the interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the Internet, the World Wide Web, and others. The interconnect fabric may be implemented with a physical medium such as a wire or fiber optic cable, or it may be implemented in a wireless environment. In one embodiment of the invention, the interconnect fabric provides actively managed, low-latency, high-bandwidth communications between the client computer and the services being accessed. One embodiment contemplates a single-level, switched network, with cooperative (as opposed to competing) network traffic. Dedicated or shared communications interconnects may be used in the present invention.

Embodiment of Computer Execution Environment (Hardware)

Figure 6:
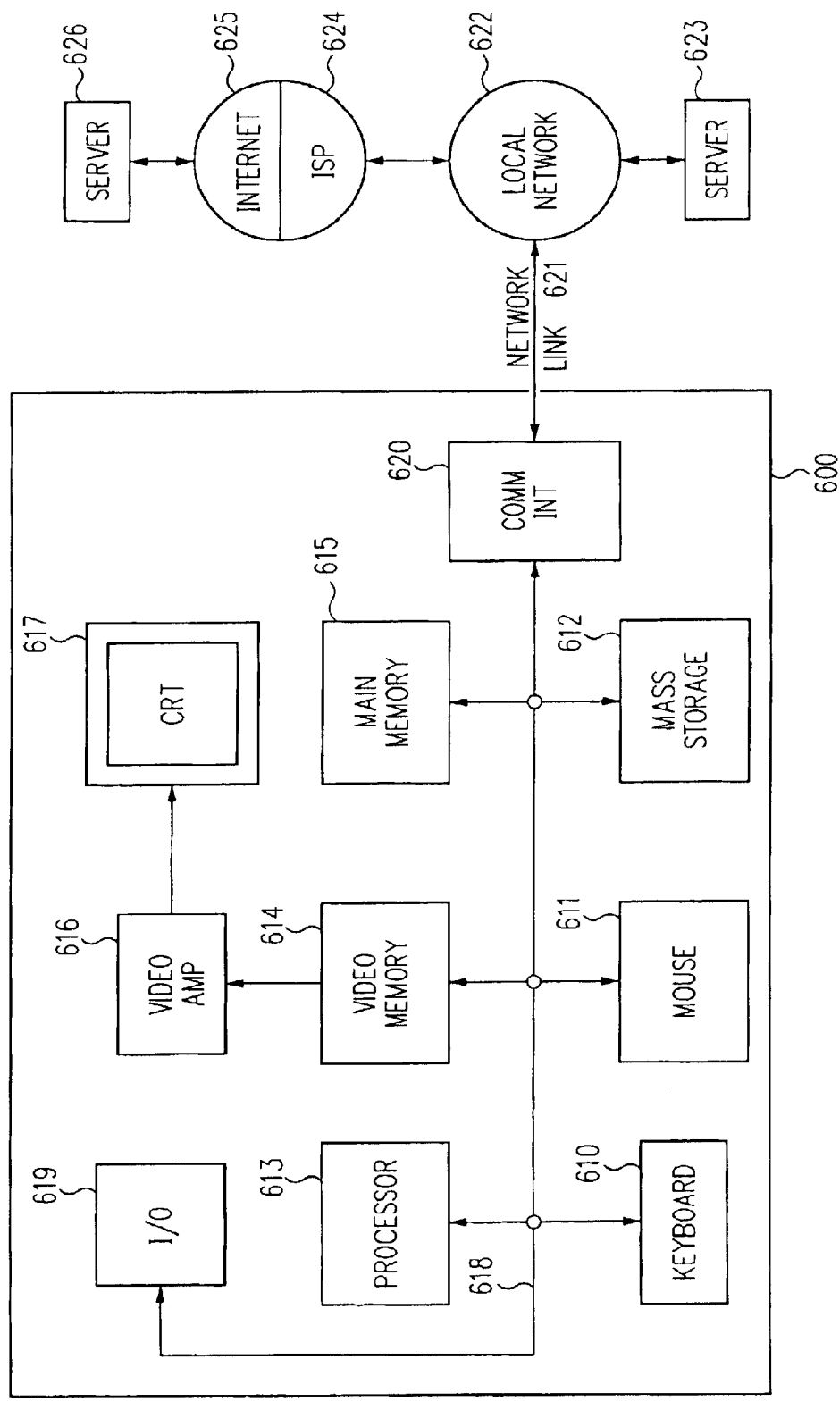
FIG. 6 comprises a block diagram of an example of a general-purpose computer system in which an embodiment of the invention may be implemented.

An embodiment of the invention can be implemented as computer software in the form of computer readable program code executed on one or more general-purpose computers such as the computer 1200 illustrated in FIG. 6. A keyboard 610 and mouse 611 are coupled to a bi-directional system bus 618 (e.g., PCI, ISA or other similar architecture). The keyboard and mouse are for introducing user input to the computer system and communicating that user input to central processing unit (CPU) 613. Other suitable input devices may be used in addition to, or in place of, the mouse 611 and keyboard 610. I/O (input/output) unit 619 coupled to bi-directional system bus 618 represents possible output devices such as a printer or an A/V (audio/video) device.

Computer 600 includes video memory 614, main memory 615, mass storage 612, and communication interface 620. All these devices are coupled to a bi-directional system bus 618 along with keyboard 610, mouse 611 and CPU 613. The mass storage 612 may include both fixed and removable media, such as magnetic, optical or magnetic optical storage systems or any other available mass storage technology. The system bus 618 provides a means for addressing video memory 614 or main memory 615. The system bus 618 also provides a mechanism for the CPU to transferring data between and among the components, such as main memory 615, video memory 614 and mass storage 612.

In one embodiment of the invention, the CPU 613 is a microprocessor manufactured by Motorola, such as the 680x0 processor, an Intel Pentium III processor, or an UltraSparc processor from Sun Microsystems. However, any other suitable processor or computer may be utilized. Video memory 614 is a dual ported video random access memory. One port of the video memory 614 is coupled to video accelerator 616. The video accelerator device 616 is used to drive a CRT (cathode ray tube), and LCD (Liquid Crystal Display), or TFT (Thin-Film Transistor) monitor 617. The video accelerator 616 is well known in the art and may be implemented by any suitable apparatus. This circuitry converts pixel data stored in video memory 614 to a signal suitable for use by monitor 617. The monitor 617 is a type of monitor suitable for displaying graphic images.

The computer 600 may also include a communication interface 620 coupled to the system bus 618. The communication interface 620 provides a two-way data communication coupling via a network link 621 to a network 622. For example, if the communication interface 620 is a modem, the communication interface 620 provides a data communication connection to a corresponding type of telephone line, which comprises part of a network link 621. If the communication interface 620 is a Network Interface Card (NIC), communication interface 620 provides a data communication connection via a network link 621 to a compatible network. Physical network links can include Ethernet, wireless, fiber optic, and cable television type links. In any such implementation, communication interface 620 sends and receives electrical, electromagnetic or optical signals which carry digital data streams representing various types of information.

The network link 621 typically provides data communication through one or more networks to other data devices. For example, network link 621 may provide a connection through local network 622 to a host computer 623 or to data equipment operated by an Internet Service Provider (ISP) 624. ISP 624 in turn provides data communication services through the world wide packet data communication network now commonly referred to as the "Internet" 625. Local network 622 and Internet 625 both use electrical, electromagnetic or optical signals that carry digital data streams to files. The signals through the various networks and the signals on network link 621 and through communication interface 620, which carry the digital data to and from computer 600, are exemplary forms of carrier waves for transporting the digital information.

The computer 600 can send messages and receive data, including program code, through the network(s), network link 621, and communication interface 620. In the Internet example, server 626 might transmit a requested code for an application program through Internet 625, ISP 624, local network 622 and communication interface 620.

The computer systems described above are for purposes of example only. An embodiment of the invention may be implemented in any type of computer system or programming or processing environment. When a general purpose computer system such as the one described executes the process and process flows described herein, it is configured to provide a mechanism for billable multicast.

Thus, a method and apparatus for performing billable multicast is described. The invention is defined by the claims and the full scope of each claims equivalents.

What is claimed is:

1. A system comprising:

a multicast server configured to transmit at least one packet in a plurality of multicast packets, a portable device configured to obtain an encrypted multicast data, said portable device configured to determines which of said multicast packets is encrypted based on the randomness of data in said multicast packets, wherein said portable device comprises at least one cryptographic key for unlocking said encrypted multicast data;

a portable device interface, wherein said portable device interface interconnects said multicast server and said portable device.

* * * * *